US011225942B2

(12) United States Patent
Riahi et al.

(10) Patent No.: US 11,225,942 B2
(45) Date of Patent: Jan. 18, 2022

(54) ENHANCED THROUGH-THICKNESS RESIN INFUSION FOR A WIND TURBINE COMPOSITE LAMINATE

(71) Applicant: General Electric Company, Schenectady, NY (US)

(72) Inventors: Amir Riahi, Simpsonville, SC (US); Swapnil Dhumal, Bangalore (IN); Xu Chen, Simpsonville, SC (US); Thomas Merzhaeuser, Munich (DE)

(73) Assignee: General Electric Company, Schenectady, NY (US)

( * ) Notice: Subject to any disclaimer, the term of this patent is extended or adjusted under 35 U.S.C. 154(b) by 570 days.

(21) Appl. No.: 15/641,567

(22) Filed: Jul. 5, 2017

(65) Prior Publication Data
US 2019/0010918 A1   Jan. 10, 2019

(51) Int. Cl.
| B29C 70/54 | (2006.01) |
| F03D 1/06 | (2006.01) |
| B32B 5/02 | (2006.01) |
| B32B 5/18 | (2006.01) |
| B32B 37/14 | (2006.01) |

(Continued)

(52) U.S. Cl.
CPC .......... *F03D 1/0675* (2013.01); *B29C 70/547* (2013.01); *B29D 99/0025* (2013.01); *B32B 5/024* (2013.01); *B32B 5/026* (2013.01); *B32B 5/028* (2013.01); *B32B 5/18* (2013.01); *B32B 37/14* (2013.01); *B29L 2031/08* (2013.01); *B32B 2266/06* (2013.01); *B32B 2603/00* (2013.01);

(Continued)

(58) Field of Classification Search
CPC .................................................... B29C 70/547
See application file for complete search history.

(56) References Cited

U.S. PATENT DOCUMENTS

| 3,956,564 A | * | 5/1976 | Hillig | ..................... B29C 70/20 |
| | | | | 428/366 |
| 4,519,591 A | * | 5/1985 | Bush | ..................... B29C 69/002 |
| | | | | 267/148 |

(Continued)

FOREIGN PATENT DOCUMENTS

| EP | 3 124 243 A1 | 2/2017 |
| WO | WO2007/038930 A1 | 4/2007 |
| WO | 2014/166493 A1 | 10/2014 |

OTHER PUBLICATIONS

International Search Report and Written Opinion issued in connection with corresponding PCT Application No. PCT/US18/40556 dated Nov. 15, 2018.

(Continued)

*Primary Examiner* — Matthew J Daniels
*Assistant Examiner* — Andrew D Graham
(74) *Attorney, Agent, or Firm* — Dority & Manning, P.A.

(57) ABSTRACT

A wind turbine composite laminate component and method for producing it is disclosed as initially assembling a laminated structure having at least two reinforced layers and a plurality of interleaf layers positioned adjacent to one of the at least two reinforced layers. Then placing the laminated structure into a mold where resin is sequentially and independently transferred into each of the plurality of interleaf layers. Then curing the transferred resin in the laminated structure to form a composite laminate component having the at least two reinforced layers, the plurality of interleaf layers, and cured resin.

9 Claims, 6 Drawing Sheets

(51) Int. Cl.
   *B29D 99/00* (2010.01)
   *B29L 31/08* (2006.01)
(52) U.S. Cl.
   CPC ... *F05B 2230/23* (2013.01); *F05B 2280/6002* (2013.01); *F05B 2280/6003* (2013.01)

(56) References Cited

U.S. PATENT DOCUMENTS

| | | | | |
|---|---|---|---|---|
| 4,539,253 A * | 9/1985 | Hirschbuehler | ........ | B29C 70/08 442/239 |
| 4,707,317 A * | 11/1987 | Epel | ........ | B29C 70/081 156/180 |
| 4,714,575 A * | 12/1987 | Preston | ........ | B29C 44/0469 264/257 |
| 4,783,506 A * | 11/1988 | Gawin | ........ | C08G 59/226 525/109 |
| 4,868,050 A * | 9/1989 | Tanaka | ........ | B29C 70/086 428/335 |
| 4,888,247 A * | 12/1989 | Zweben | ........ | B32B 15/08 428/105 |
| 4,954,382 A * | 9/1990 | Riefler | ........ | B29C 70/086 428/116 |
| 5,028,478 A * | 7/1991 | Odagiri | ........ | C08J 5/24 428/327 |
| 5,085,928 A * | 2/1992 | Krueger | ........ | B29C 70/083 428/474.4 |
| 5,104,718 A * | 4/1992 | Asada | ........ | B29C 37/0064 156/196 |
| 5,141,804 A * | 8/1992 | Riefler | ........ | B29C 70/086 156/292 |
| 5,190,802 A * | 3/1993 | Pilato | ........ | B32B 5/26 428/111 |
| 5,279,893 A * | 1/1994 | Hattori | ........ | B29C 70/20 428/300.4 |
| 5,333,568 A * | 8/1994 | Meldner | ........ | B29C 70/44 114/102.31 |
| 5,543,212 A * | 8/1996 | Oosedo | ........ | B29C 70/083 442/319 |
| 5,597,631 A * | 1/1997 | Furumoto | ........ | B29C 70/086 428/36.4 |
| 5,721,034 A * | 2/1998 | Seemann, III | ........ | B29C 43/021 428/71 |
| 5,904,972 A * | 5/1999 | Tunis, III | ........ | B29C 43/021 428/178 |
| 6,048,488 A * | 4/2000 | Fink | ........ | B29C 70/08 264/102 |
| 6,656,411 B1 * | 12/2003 | McClure | ........ | B29C 70/547 264/257 |
| 6,670,291 B1 * | 12/2003 | Tompkins | ........ | B32B 27/12 428/332 |
| 6,919,039 B2 | 7/2005 | Lang et al. | | |
| 6,995,099 B1 * | 2/2006 | Nishimura | ........ | B29C 70/083 442/59 |
| 7,048,985 B2 | 5/2006 | Mack et al. | | |
| 7,081,218 B2 | 7/2006 | Sekido et al. | | |
| 7,147,818 B1 * | 12/2006 | Rigas | ........ | B29C 70/443 264/510 |
| 7,351,040 B2 | 4/2008 | Livingston et al. | | |
| 7,727,631 B2 * | 6/2010 | Fang | ........ | B29C 70/443 264/257 |
| 8,048,815 B2 * | 11/2011 | Kubota | ........ | C08J 5/24 428/364 |
| 8,741,198 B2 * | 6/2014 | Sekido | ........ | B29C 70/345 264/258 |
| 9,205,602 B2 | 12/2015 | Shinoda et al. | | |
| 2002/0167119 A1 * | 11/2002 | Hemphill | ........ | B29C 70/443 264/510 |
| 2003/0011094 A1 | 1/2003 | Filsinger et al. | | |
| 2003/0162461 A1 * | 8/2003 | Balthes | ........ | B29C 43/003 442/411 |
| 2004/0028884 A1 * | 2/2004 | Woolstencroft | ........ | B29C 70/08 428/292.1 |
| 2004/0140587 A1 * | 7/2004 | Hadley | ........ | B29C 35/0266 264/257 |
| 2005/0104259 A1 * | 5/2005 | Bannister | ........ | B29C 70/086 264/511 |
| 2006/0178064 A1 * | 8/2006 | Balthes | ........ | B29C 43/003 442/59 |
| 2006/0252334 A1 * | 11/2006 | LoFaro | ........ | B32B 5/022 442/400 |
| 2007/0107220 A1 * | 5/2007 | Bakhuis | ........ | B29C 70/086 29/889.7 |
| 2007/0108646 A1 * | 5/2007 | Louderback | ........ | B29C 70/443 264/40.5 |
| 2007/0160479 A1 * | 7/2007 | Livingston | ........ | B29C 70/34 416/230 |
| 2008/0277053 A1 | 11/2008 | Stiesdal | | |
| 2008/0295955 A1 * | 12/2008 | Cawse | ........ | B32B 5/22 156/276 |
| 2009/0035148 A1 * | 2/2009 | Livingston | ........ | F03D 1/0675 416/232 |
| 2009/0142193 A1 * | 6/2009 | Bech | ........ | F03D 1/0675 416/144 |
| 2009/0181250 A1 * | 7/2009 | Zmarsly | ........ | B29C 70/606 428/352 |
| 2009/0229748 A1 * | 9/2009 | Berchtold | ........ | B29C 35/02 156/308.2 |
| 2009/0280294 A1 * | 11/2009 | Branca | ........ | B29C 70/086 428/138 |
| 2010/0098906 A1 * | 4/2010 | Bongiovanni | ........ | B29C 37/0064 428/138 |
| 2010/0170746 A1 * | 7/2010 | Restuccia | ........ | B29C 70/083 181/290 |
| 2010/0189973 A1 * | 7/2010 | Mikkelsen | ........ | B29C 70/443 428/213 |
| 2010/0324208 A1 | 12/2010 | Motsanos et al. | | |
| 2011/0017867 A1 * | 1/2011 | Simmons | ........ | C08J 5/24 244/1 A |
| 2011/0142662 A1 * | 6/2011 | Fritz | ........ | F03D 1/0675 416/226 |
| 2011/0171034 A1 * | 7/2011 | Whiter | ........ | B29C 37/0067 416/223 R |
| 2011/0294387 A1 * | 12/2011 | Simmons | ........ | B32B 5/022 442/376 |
| 2012/0164907 A1 * | 6/2012 | Restuccia | ........ | B32B 5/022 442/381 |
| 2013/0005205 A1 * | 1/2013 | Fisset | ........ | B29C 70/025 442/59 |
| 2013/0011653 A1 * | 1/2013 | Whiter | ........ | B32B 27/12 428/221 |
| 2013/0115410 A1 * | 5/2013 | Whiter | ........ | B32B 5/26 428/95 |
| 2013/0175740 A1 * | 7/2013 | Shinoda | ........ | B29C 43/3642 264/571 |
| 2013/0266750 A1 * | 10/2013 | Grove-Nielsen | ... | B32B 37/1009 428/35.7 |
| 2013/0280483 A1 * | 10/2013 | Hayashi | ........ | B29C 70/48 428/137 |
| 2013/0330514 A1 * | 12/2013 | Cawse | ........ | B32B 5/26 428/143 |
| 2014/0057096 A1 * | 2/2014 | Moser | ........ | B32B 5/28 428/295.4 |
| 2014/0147688 A1 * | 5/2014 | Corral | ........ | B29C 70/546 428/519 |
| 2014/0178204 A1 * | 6/2014 | Livingston | ........ | B29C 70/443 416/230 |
| 2014/0186642 A1 * | 7/2014 | Kybelund | ........ | C09J 137/00 428/523 |
| 2014/0261970 A1 * | 9/2014 | Moors | ........ | B29C 70/021 156/87 |
| 2014/0335361 A1 * | 11/2014 | Ellis | ........ | B32B 37/24 428/413 |
| 2015/0014883 A1 * | 1/2015 | Yamamoto | ........ | B29C 70/48 264/258 |
| 2015/0017853 A1 * | 1/2015 | Perillat-Collomb | ........ | B29C 70/467 442/1 |

(56) References Cited

U.S. PATENT DOCUMENTS

| | | | | |
|---|---|---|---|---|
| 2015/0336323 A1* | 11/2015 | Inada | ...................... | B29C 70/46 |
| | | | | 264/320 |
| 2015/0360426 A1* | 12/2015 | Radanitsch | ........... | B29C 70/443 |
| | | | | 264/78 |
| 2016/0047252 A1* | 2/2016 | Merzhaeuser | .......... | B29C 70/00 |
| | | | | 416/229 A |
| 2016/0082691 A1* | 3/2016 | Restuccia | ............... | B32B 5/022 |
| | | | | 442/377 |
| 2016/0115939 A1* | 4/2016 | Shair | ...................... | F03D 13/10 |
| | | | | 416/229 A |
| 2016/0167332 A1* | 6/2016 | Mourtazov | ........ | B29D 99/0021 |
| | | | | 428/116 |
| 2016/0257102 A1* | 9/2016 | Butler | .................... | B29C 70/547 |
| 2016/0263844 A1* | 9/2016 | Smith | ................... | B29C 70/525 |
| 2017/0002791 A1* | 1/2017 | Yarbrough | ............ | F03D 1/0675 |
| 2017/0129207 A1* | 5/2017 | Hollander | ............... | B29C 70/08 |
| 2019/0010918 A1* | 1/2019 | Riahi | ................... | F03D 1/0675 |
| 2019/0039337 A1* | 2/2019 | Nielsen | ................. | B29C 70/443 |
| 2019/0061290 A1* | 2/2019 | Whiter | ................. | B29C 70/547 |

OTHER PUBLICATIONS

European Search Report for EP Application No. 18828793.2, dated Mar. 10, 2021.

* cited by examiner

| | FILL TIME (MIN) | |
|---|---|---|
| | ACTUAL | MODEL |
| BASELINE | 60 | 62 |
| INTERLEAFED WITH MULTIFL | 37 | 39 |
| PERCENT REDUCTION | 38% | 37% |

*FIG. 6*

ENHANCED THROUGH-THICKNESS RESIN INFUSION FOR A WIND TURBINE COMPOSITE LAMINATE

FIELD OF THE INVENTION

The present subject matter relates generally to wind turbines and, more particularly, to systems and methods for infusing resin into composite wind turbine rotor blades and other wind turbine components.

BACKGROUND OF THE INVENTION

Generally, a wind turbine includes a tower, a nacelle mounted on the tower, and a rotor coupled to the nacelle. The rotor generally includes a rotatable hub and a plurality of rotor blades coupled to and extending outwardly from the hub. Each rotor blade may be spaced about the hub so as to facilitate rotating the rotor to enable kinetic energy to be converted into usable mechanical energy, which may then be transmitted to an electric generator disposed within the nacelle for the production of electrical energy. Typically, the blades are fabricated from composite materials formed in a mold. For instance, carbon fiber composite, glass fiber composite, or fiber reinforced plastic preforms can be laid-up and infused with a resin to bond the layers into final form.

Composite infusions are closed-mold processes for fabricating large fiber-reinforced composite structures. In the simplest form, a laminate fiber preform is installed onto a mold surface and sealed with an outer mold surface. A vacuum is applied to remove entrapped air from the preform and resin is then allowed to infuse into the preform and cure. As typical thermosetting resins have high viscosities, processing techniques have been developed to improve the speed and quality of resin infusion. The flow rate v (m/s) of a resin can be expressed as $v = -K \cdot \Delta P / \mu$; where K denotes permeability, an index representing the easiness of impregnation into the reinforcing fiber base material with the resin, P denotes the pressure of the resin, and $\mu$ denotes the viscosity of the resin. In this formula, $\Delta P$ represents the pressure gradient. As the value of permeability increases, it becomes easier to impregnate the reinforcing fiber base material with the resin. It can be seen that the impregnation distance of the resin is proportional to the permeability of the reinforcing fiber base material used and the pressure of the resin and inversely proportional to the viscosity of the resin.

One processing technique uses a flow medium for a faster injection of resin into a fiber layup structure in order to produce a composite. Specifically, flow media are used in order to distribute resin within a fiber layup structure and to increase the injection speed of the resin into the fiber layup structure. Depending on the geometry and the final size of the produced composite component it is often not possible to inject the necessary amount of resin without the use of a flow medium, because the flow resistance of the resin into the fiber layup structure is too large.

A large number of different flow media are known which are usable for a variety of different processing conditions. However, common for these different flow media is the somewhat labor intensive lay-up of the respective flow medium and even more so, the removal of the respective flow medium after the resin within the composite component has been cured. Furthermore, during use, the flow medium absorbs a relative large amount of resin, which must subsequently be discarded.

BRIEF DESCRIPTION OF THE INVENTION

Aspects and advantages of the invention will be set forth in part in the following description, or may be obvious from the description, or may be learned through practice of the invention.

In one aspect, a method for producing a composite laminate component for a wind turbine is disclosed as initially assembling a laminated structure having at least two reinforced layers and a plurality of interleaf layers positioned adjacent to one of the at least two reinforced layers. Then placing the laminated structure into a mold where resin is sequentially and independently transferred into each layer of the plurality of interleaf layers. Then curing the transferred resin in the laminated structure to form a composite laminate component having the at least two reinforced layers, the plurality of interleaf layers, and cured resin.

In another aspect, the present subject matter discloses a wind turbine composite laminate component having at least two reinforced layers and a plurality of interleaf layers positioned adjacent to one of the at least two reinforced layers. The laminate component is configured to sequentially and independently transfer resin into each layer of the plurality of interleaf layers, and cure the transferred resin in the laminated structure to form a composite laminate component comprising the at least two reinforced layers, the plurality of interleaf layers, and cured resin.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter discloses systems and methods for fabricating composite laminates by placing high permeability flow media interleaf layers in the thickness of the laminate stack with a dedicated resin feed line for each flow media interleaf layer. Providing a dedicated feed line for each interleaf layer significantly increases the pressure driving force through-thickness which is at least partially responsible for the fill time reduction. Infusion of resin through the composite thickness is accomplished by sequentially triggering the resin feed lines, which can also prevent defect formation in the composite structure. Also, a separation layer, such as a non-porous peel ply section, can be placed between the resin feed lines to prevent defect formation.

The term "fiber" as used herein means thin filamentous fibers, but may also be rovings (fiber bunches), bands of rovings or mats, which may be felt mats of single-fibers or mats of fiber rovings. Alternatively, fiber in the form of non-woven, melt-spun fiber mat or fabric may be impregnated with a modified polyester matrix resin to form a prepreg for use in a variety of fabrication processes. Chopped or milled fibers may also be used. The fibers used in the present invention are preferably glass fibers or carbon fibers. By the term carbon fiber is meant any of the conventional carbonized or graphitized fibers obtained by known processes from such organic fiber or filament precursors as rayon, polyacrylonitrile (PAN), pitch or the like.

The term "resin" as used herein means a natural or synthetic resin or a suitable polymer. The resin can be a combination of a liquid ethylenically unsaturated monomer and unsaturated polyester to form a polyester resin composition. The resin can also be a polyester, vinyl ester and epoxy resin. However, the resin in the context of the present invention can also be a combined system including other chemicals such as catalysts, hardening agents, accelerator and additives (e.g. thixotropic, pigment, filler, chemical/fire resistance, etc.).

The term "curing" as used herein means that the resin becomes a chemically resistant hard solid. The molecules in the resin will cross-link assisted by catalysts or hardening agents, and the process is a non-reversible chemical reaction.

The term "porous" as used herein is used to describe a material structure filled with voids or pores and relates to a three-dimensional structure allowing flow of a liquid phase in multiple directions of the structure such as a knitted, woven, needled or crocheted, foamed, or filter-like material.

The term "high permeability" is considered intrinsic permeability of a media with values ranging from $1\times10^{-9}$ to $1\times10^{-7}$ $m^2$, and "low permeability" is considered values ranging from $1\times10^{-10}$ to $1\times10^{-12}$ $m^2$.

Figure 1:
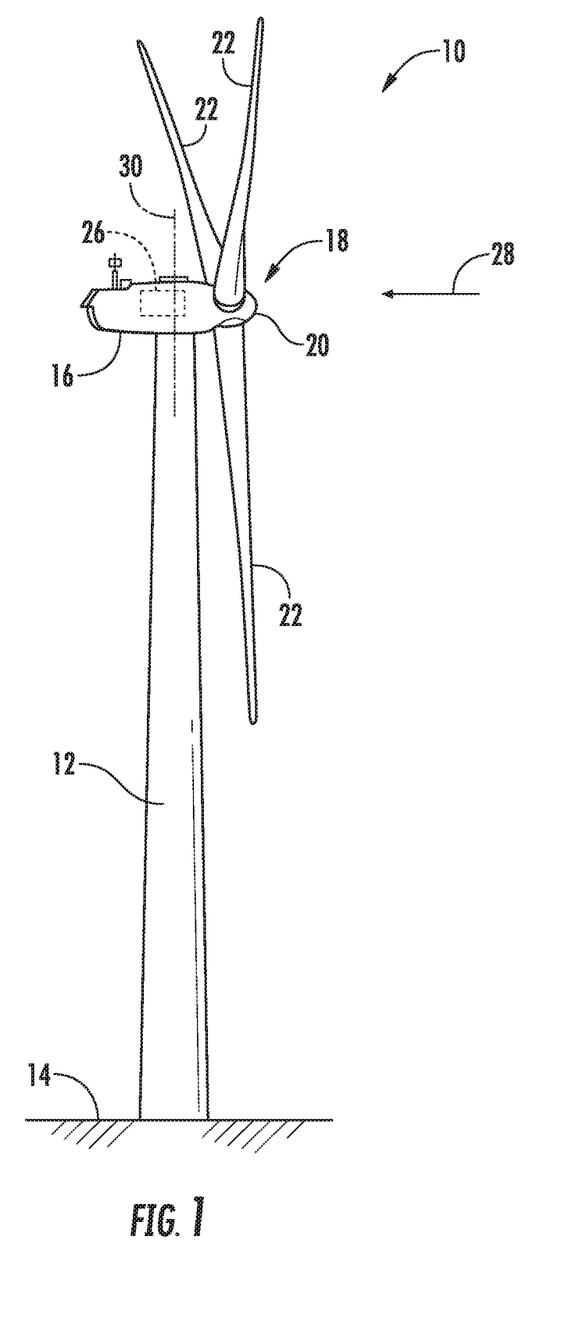
FIG. 1 illustrates a perspective view of one embodiment of a wind turbine.

Referring now to the drawings, FIG. 1 illustrates a perspective view of one embodiment of a wind turbine 10 of conventional construction. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator positioned within the nacelle 16 to permit electrical energy to be produced.

Figure 2:
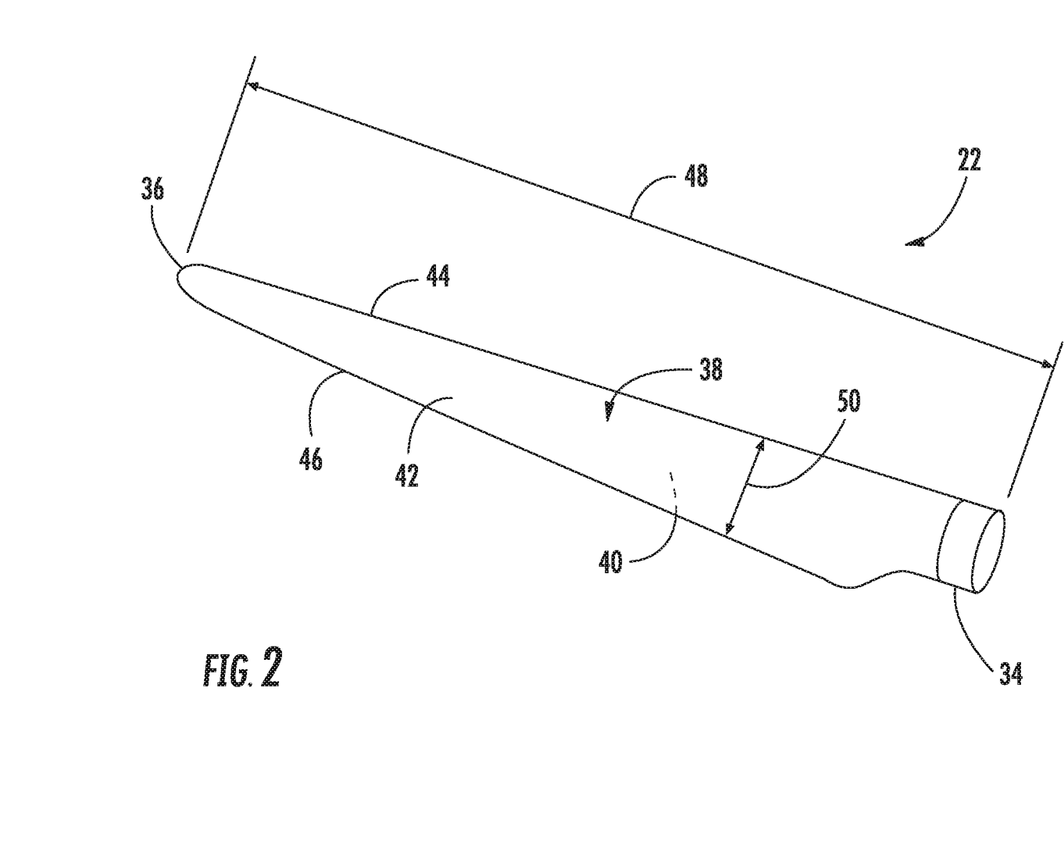
FIG. 2 illustrates a perspective view of one embodiment of one of the rotor blades of the wind turbine shown in FIG. 1.

Referring now to FIG. 2, a perspective view of one of the rotor blades 22 shown in FIG. 1 is illustrated. As shown, the rotor blade 22 generally includes a blade root 34 configured for mounting the rotor blade 22 to the hub 20 of the wind turbine 10 (FIG. 1) and a blade tip 36 disposed opposite the blade root 34. A body 38 of the rotor blade 22 may generally be configured to extend between the blade root 34 and the blade tip 36 and may serve as the outer casing/skin of the blade 22. In several embodiments, the body 38 may define a substantially aerodynamic profile, such as by defining a symmetrical or cambered airfoil-shaped cross-section. As such, the body 38 may include a pressure side 40 and a suction side 42 extending between a leading edge 44 and a trailing edge 46. Further, the rotor blade 22 may have a span 48 defining the total length between the blade root 34 and the blade tip 36 and a chord 50 defining the total length between the leading edge 44 and the trialing edge 46. As is generally understood, the chord 40 may vary in length with respect to the span 48 as the rotor blade 22 extends from the blade root 34 to the blade tip 36.

In several embodiments, the body 38 of the rotor blade 22 may be formed as a single, unitary component. Alternatively, the body 38 may be formed from a plurality of shell components. For example, the body 38 may be manufactured from a first shell half generally defining the pressure side 40 of the rotor blade 22 and a second shell half generally defining the suction side 42 of the rotor blade 20, with the shell halves being secured to one another at the leading and trailing edges 44, 46 of the blade 22. Additionally, the body 38, the blade root 34, and the blade tip 36 may generally be formed from any suitable material. For instance, in one embodiment, the blade root 34 may be formed entirely from a laminate composite material, such as a carbon fiber reinforced laminate composite or a glass fiber reinforced laminate composite.

Figure 3:
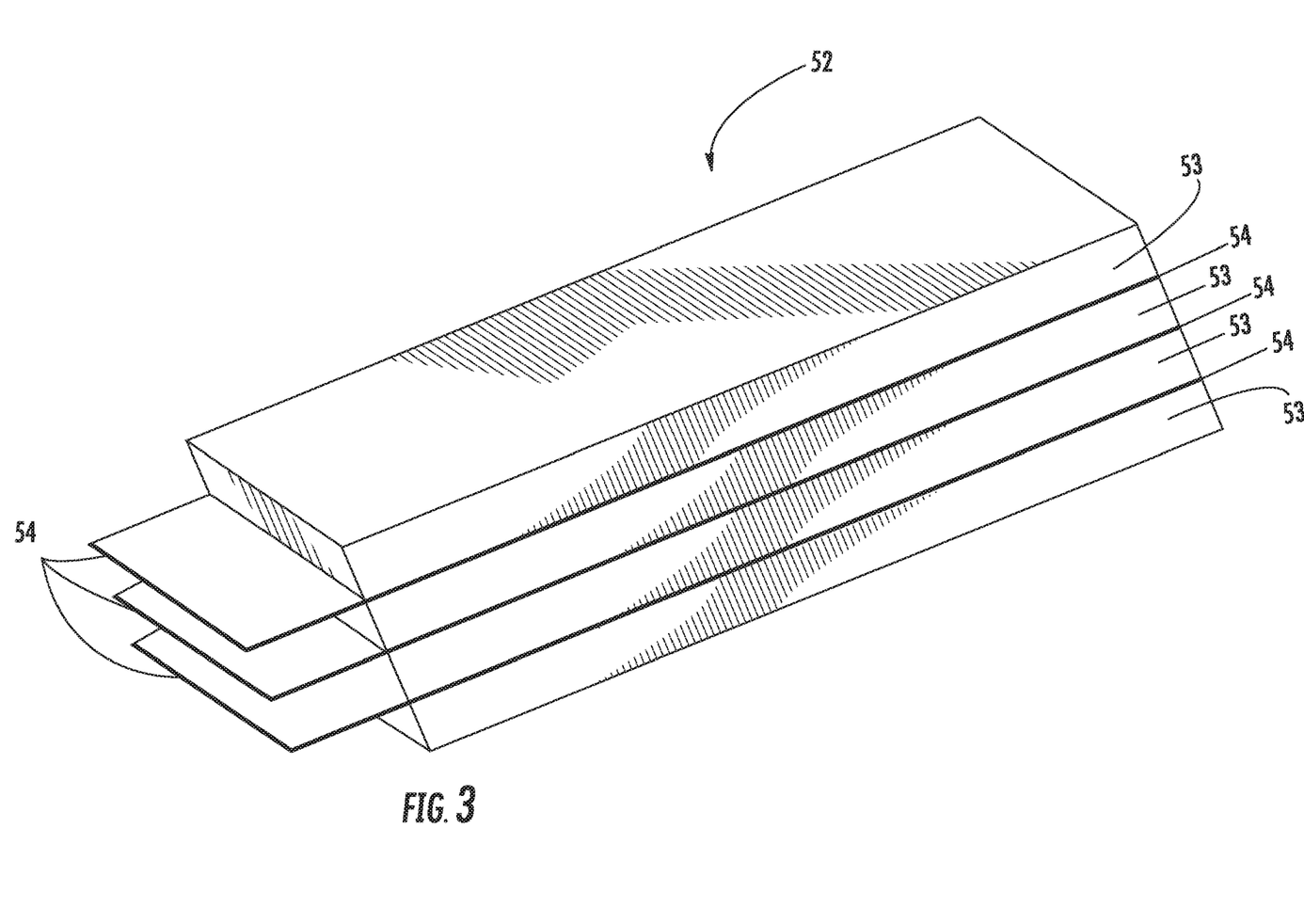
FIG. 3 illustrates a modeled laminated structure with exemplary interleaf layers and reinforced layers.
Figure 4:
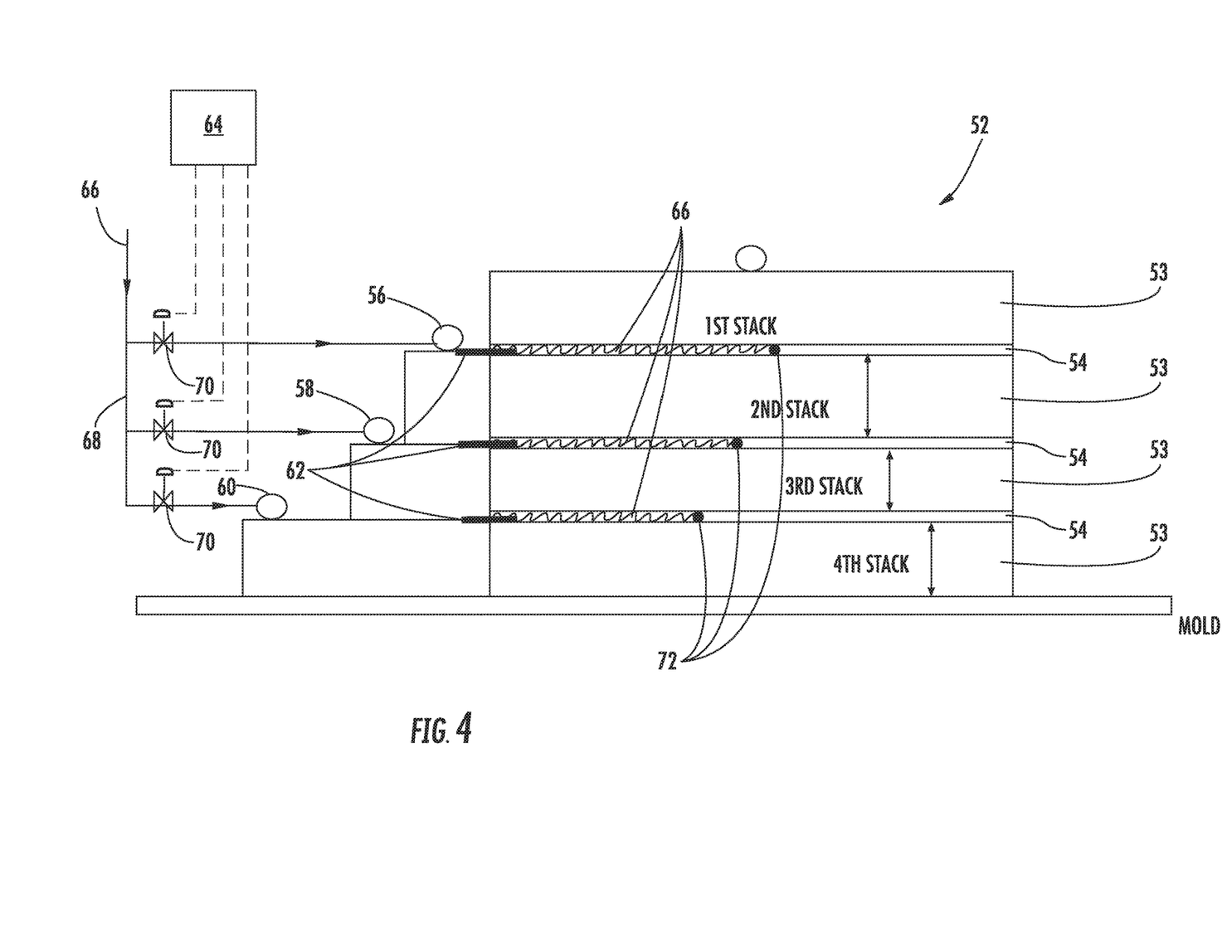
FIG. 4 is a schematic of an exemplary laminated structure for a composite laminate composite having independent and sequential resin feed lines.

FIGS. 3 and 4 depict a portion of thick composite laminated structure 52, such as portion of blade root 34. The laminated structure 52 can have at least two reinforced layers 53 and a plurality of interleaf layers 54 positioned adjacent to one of the at least two reinforced layers 53. To eliminate the risk of premature gelling of infusion resin before the laminated structure 52 is filled, and to increase the speed of the resin flow front 72 through the laminated structure 52 thickness (i.e. eliminate slow infusion), and to reduce the risk of infusion defects, each interleaf layer 54 of the thick composite laminated structure 52 has a dedicated, isolated, and independent resin feed line 56, 58, 60 attached to it. Those resin feed lines 56, 58, 60 are sequentially opened during resin infusion, using a predetermined time delay between initiation of resin feed to each subsequent interleaf layer 54, to bring fresh resin into the interleaf layer 54 which maximizes the pressure gradient in the resin flow direction as each feed line is sequentially and independently triggered open. As seen in FIG. 4, the resin flow front 72 can be staggered in the resin flow direction such that the resin flow fronts 72 are not in the same vertical plane. Computer simulations and subcomponent field trials have demonstrated about a 38% reduction in resin fill time for a thick composite laminate 52.

For example, at the wind blade root 34 section where the thickest laminate is in a blade shell (i.e. root overbuild region), a narrow piece of non-porous (impermeable to resin) peel ply 62 can be placed directly underneath an entrance portion of each interleaf layer 54 to guide resin flow directly from the dedicated resin feed line 56, 58, 60 and avoid potential resin race tracking occurring between the root 34 end face of the laminate and the root edge dam surface. The peel ply 62 can be in the root overbuild region which can be trimmed off in a secondary operation.

The high permeability interleaf layer 54 media can be a continuous fiber mat having an intrinsic permeability in the range of about $1\times10^{-9}$ to about $1\times10^{-7}$ squared meters. The interleaf layer 54 acts as a structural ply and can have its own resin feed line 56, 58, 60 that can be triggered individually, independently and sequentially by a resin flow control circuit 64. A resin infusion manifold 68 can supply resin 66 through control valves 70 on each resin feed line 56, 58, 60 to sequentially trigger the supply of resin to each resin feed line 56, 58, 60, thereby providing faster resin infusion that is less prone to form infusion defects. The interleaf layer 54 structural media can be woven, knitted, open celled foam, sponge-like, mesh-like, filter-like, or combinations thereof. The interleaf layer 54 can be an elastic and/or flexible material, which can be inserted in the laminated structure 52 not only in a planar but also in a three-dimensionally curved manner, such as corrugated.

As mentioned above, laminated structure 52 filling time and the speed of the resin flow front 72 for thick laminates is primarily a function of thru-thickness intrinsic permeability (K) and pressure difference driving force, or pressure gradient ($\Delta P$). Pressure gradient ($\Delta P$) decreases as resin flows into the component and movement of flow front 72 becomes slower and slower. By independently, individually, and sequentially triggering intermediate resin feed lines 56, 58, 60 attached to each high permeability interleaf layer 54, the pressure gradient ($\Delta P$) resets to maximum value and thereby filling the laminate 52 faster. High permeability interleaf layers 54 assist resin 66 flow by quickly transporting resin 66 in-plane.

Figure 5:
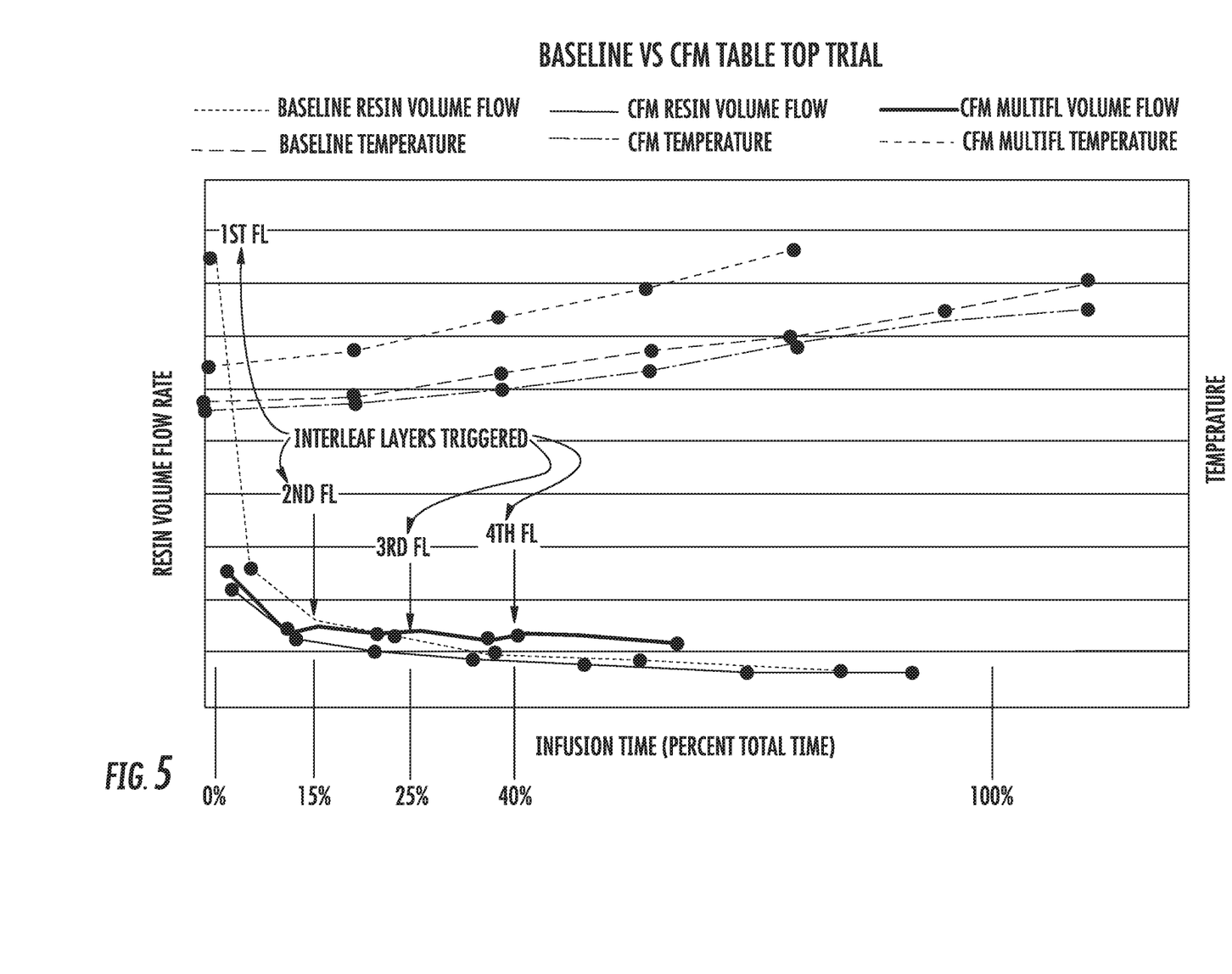
FIG. 5 is a graph of infusion time vs. resin volume flow rate and temperature for a baseline composite and a composite having exemplary continuous fiber mat (CFM) interleaf layers.

FIG. 5 is a graph showing a $1^{st}$ resin feed line (FL) triggered first, then the $2^{nd}$, $3^{rd}$, and $4^{th}$ FL's are triggered independently and sequentially by a time delay that can be predetermined in an independent test, for example, by timing the flow front 72 to wet the one stack. In the FIG. 5 embodiment, all stacks of reinforced layers 53 are equal thickness and ply. The predetermined time delay for triggering feed line resin flow is graphed as "Percent Total Time" for sequentially transferring the resin into each interleaf layer of this exemplary laminate component. The predetermine time delay between the $1^{st}$ feed line (FL) and the $2^{nd}$ FL is about 15% of the total time. The feed line flow predetermined time delay between the $1^{st}$ interleaf layer 54 and the $3^{rd}$ interleaf layer 54 is about 25% of the total time. And the feed line flow predetermined time delay between the $1^{st}$ interleaf layer 54 and the $4^{th}$ interleaf layer 54 is about 40% of the total time.

Figure 6:
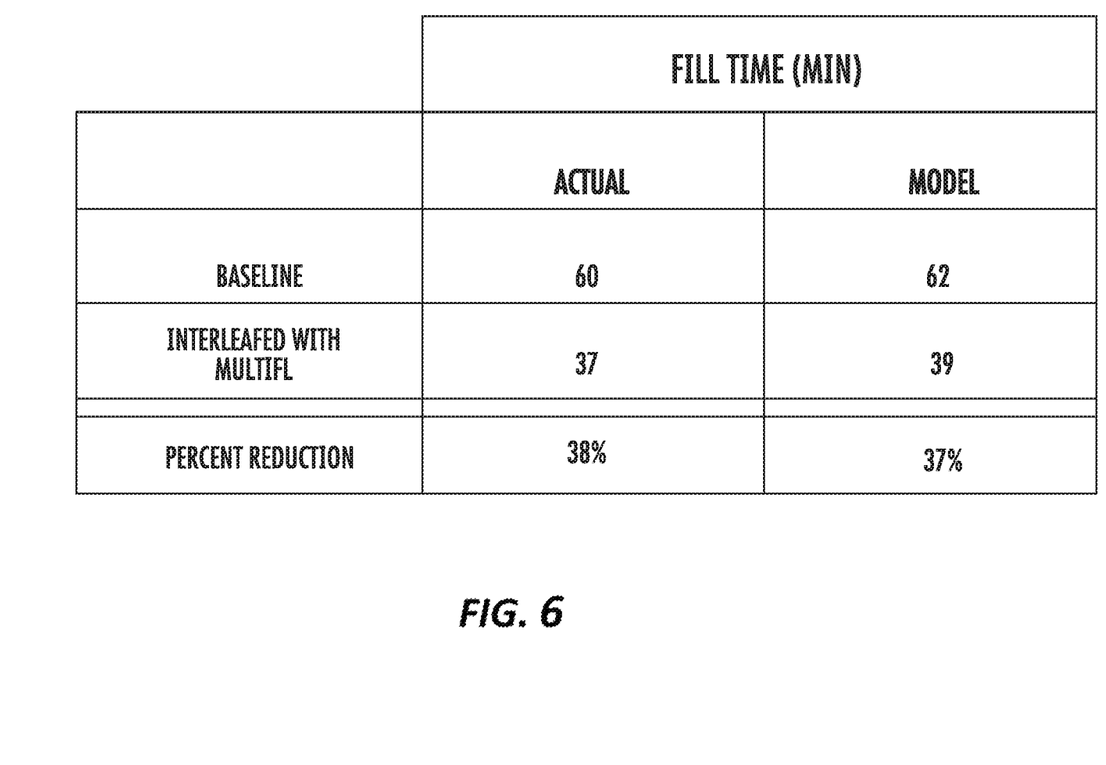
FIG. 6 is a table of actual and modeled component fill times for an exemplary composite embodiment.

FIG. 6 is a table of the laminate component 52 fill times, graphed in FIG. 5, showing the actual fill time (minutes) being reduced from a baseline actual value of 60 minutes to an actual value of 37 minutes using independent and sequential resin flow to each interleaf layer 54 as disclosed herein. The modeled fill time values closely matched the actual values with a 62 minute baseline improved to 39 minutes. Both actual and modeled results showed about 38% reduction in fill time for the exemplary component.

The method and system disclosed herein of producing composite laminated structures 52 can infuse a curable viscous or liquid resin into the interleaf layers 54 with fiber reinforced layers 53 layered in the mold. The interleaf layer 54 can be a pre-cured solid layer made of a material having a higher intrinsic permeability with respect to the resin than the reinforced layer 53. Although the same material may be used for the interleaf layers 54 as is used for the fiber reinforced layers 53, it may be advantageous if a different material is used for forming the interleaf layers 54. This can provide a desired stiffness ratio of the interleaf layers 54 to the fiber reinforced layers 53 after curing the resin. Additionally, the interleaf layers 54 may be corrugated to increase the space available for resin flow.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for producing a composite laminate component for a wind turbine, comprising;
    assembling a laminated structure comprising at least two reinforced layers and a plurality of interleaf layers positioned adjacent to one of the at least two reinforced layers, wherein the plurality of interleaf layers have a higher intrinsic permeability with respect to a resin than the at least two reinforced layers, the at least two reinforced layers and the plurality of interleaf layers defining a through-thickness of the laminated structure;
    placing the laminated structure into a mold;
    triggering a first resin feed line attached to a first interleaf layer of the plurality of interleaf layers so as to establish a resin flow front within the first interleaf layer;
    following a time delay, independently triggering a second resin feed line attached to a second interleaf layer of the plurality of interleaf layers so as to establish a resin flow front within the second interleaf layer, wherein:
        the second interleaf layer is vertically disposed between the first interleaf layer and mold,
        transferring the resin into each layer of the plurality of interleaf layers establishes a pressure gradient in a resin flow across the through-thickness of the laminated structure, the resin flow comprising the resin flow front in each of the plurality of interleaf layers,
        sequentially triggering the first resin feed line and the second resin feed line resets the pressure gradient to a maximum value resulting in a fill time reduction for the laminated structure relative to a baseline fill time, and
        each of the resin flow fronts is in a different vertical plane, the resin flow infusing the through-thickness of the laminated structure; and
    curing the transferred resin in the laminated structure to form a composite laminate component comprising the at least two reinforced layers, the plurality of interleaf layers, and cured resin.

2. The method of claim 1, wherein each of the plurality of interleaf layers comprises a continuous fiber mat having an intrinsic permeability in the range of about $1\times10^{-9}$ to about $1\times10^{-7}$ squared meters.

3. The method of claim 1, wherein assembling the laminated structure further comprises placing a non-porous peel ply section adjacent a bottom of an entrance portion of at least one of the plurality of interleaf layers.

4. The method of claim 1, wherein assembling the laminated structure further comprises alternately placing each of the at least two reinforced layer adjacent the plurality of interleaf layers.

5. The method of claim 1, wherein assembling the laminated structure further comprises placing each of the at least two reinforced layers adjacent to each other.

6. The method of claim 1, further comprising, supplying the resin to a resin infusion manifold comprising independently controlled outlets to the plurality of interleaf layers.

7. The method of claim 1, further comprising, providing a predetermined time delay between resin flow initiation each of the plurality of interleaf layers.

8. The method of claim 7, further comprising determining the predetermined time delay by measuring a time period required for at least one of the plurality of interleaf layers resin flow front to wet an adjacent reinforced layer.

9. The method of claim 1, wherein the plurality of interleaf layers comprises at least one of a woven structure, a knitted structure, an open-cell foam structure, a sponge structure, a mesh structure, a filter structure, or combinations thereof.

* * * * *